US005121771A

United States Patent [19]

Jernberg

[11] Patent Number: 5,121,771

[45] Date of Patent: Jun. 16, 1992

[54] DEVICE FOR DEPRESSING A TIRE VALVE CORE IN HIGH PRESSURE CYLINDERS

[75] Inventor: Robert H. Jernberg, East Hampton, Conn.

[73] Assignee: Scott Specialty Gases, Plumsteadville, Pa.

[21] Appl. No.: 484,988

[22] Filed: Feb. 26, 1990

[51] Int. Cl.[5] .............................................. F16K 21/00

[52] U.S. Cl. ............................. 137/614.19; 251/149.5

[58] Field of Search .................. 251/148, 149.4, 149.5, 251/149.6, 149.8; 137/614, 614.19, 505.12, 505.25

[56] References Cited

U.S. PATENT DOCUMENTS

| | | | |
|---|---|---|---|
| 2,849,017 | 8/1958 | Dickens . | |
| 2,862,515 | 2/1956 | Briechle . | |
| 2,925,103 | 2/1960 | Kerr et al. | 251/149.5 X |
| 3,339,883 | 9/1967 | Drake | 251/149.4 |
| 3,844,530 | 10/1974 | Monell | 251/149.6 |
| 3,882,760 | 5/1975 | Pass . | |
| 3,907,012 | 9/1975 | Burke . | |
| 3,976,067 | 8/1976 | Amlong . | |
| 4,008,716 | 2/1977 | Amlong . | |
| 4,046,163 | 9/1977 | Novak . | |
| 4,049,037 | 9/1977 | Gale et al. . | |
| 4,054,163 | 10/1977 | Brown, Jr. et al. . | |
| 4,062,287 | 12/1977 | Millray . | |
| 4,151,857 | 5/1979 | DeMoss et al. . | |
| 4,253,510 | 3/1981 | DeLorean . | |
| 4,294,301 | 10/1981 | Lutz . | |
| 4,428,560 | 1/1984 | Erdelsky . | |
| 4,441,592 | 4/1984 | Everett . | |
| 4,481,997 | 11/1984 | Strader . | |
| 4,506,695 | 3/1985 | Kuypers . | |
| 4,611,828 | 9/1986 | Brunet . | |
| 4,653,550 | 3/1987 | Crowley . | |
| 4,739,813 | 4/1988 | Pagani . | |
| 4,773,454 | 9/1988 | Kroh et al. . | |
| 4,807,658 | 2/1989 | Patti . | |
| 4,819,685 | 4/1989 | Pagani . | |
| 4,836,235 | 6/1989 | Pagani . | |

FOREIGN PATENT DOCUMENTS

| | | |
|---|---|---|
| 1218372 | 1/1971 | United Kingdom . |
| 1240650 | 7/1971 | United Kingdom . |

*Primary Examiner*—John C. Fox
*Attorney, Agent, or Firm*—Dykema Gossett

[57] ABSTRACT

A gas dispensing assembly suitable for use in combination with an interchangeable high pressure gas supply vessel. The gas dispensing assembly includes a regulator means having a housing with a passageway and a check valve-gas flow regulator positioned in the housing passageway. The check valve is operable so as to block any gas flow above a predetermined pressure through the housing passageway from one end to the other end of the housing. The gas flow regulator controls the rate and/or pressure of the gas exiting from the regulator. The outlet demand valve has a housing with a passageway therethrough. Such housing is detachably connectable to the interchangeable high pressure gas supply vessel and to the other end of the regulator housing. A chamber is formed between such housing and the regulator housing. The height of the chamber is variable by adjusting the distance between both housings. An outlet demand valve is positioned in the housing passageway. The outlet demand valve is opened by an extended actuator, the end of which extends into the chamber. Actuator plate is movably located in the chamber. The actuator plate has at least one passageway therethrough which is not blocked by the extended actuator. The outlet demand valve is opened to high pressure gas flow by means of reducing the height of the chamber so that actuator plate forces inward the end of the extended actuator.

8 Claims, 2 Drawing Sheets

DEVICE FOR DEPRESSING A TIRE VALVE CORE IN HIGH PRESSURE CYLINDERS

BACKGROUND OF THE INVENTION

1. Field Of The Invention

The invention relates to a gas dispensing assembling and more particularly to a dispenser for dispensing oxygen when desired from a storage vessel to a face mask.

2. Prior Art

There are a number of prior art devices which meter oxygen from a vessel through an orifice and supply the oxygen to a face mask by way of a demand valve. The rate of supply of oxygen to the face mask often varies with changes in the supply pressure.

U.S. Pat. No. 3,976,067 (Amlong) discloses a gas dispensing assembly suitable, for dispensing oxygen from a vessel pressurized to 1800 pounds per square inch. The assembly includes a manually operable eccentric member to turn supply of oxygen from the vessel on and off, and a demand valve supplied with gas at the pressure inside of the vessel when the supply is turned on. There is a spring biased resilient diaphragm regulator operable to control the opening and closing of the demand valve to regulate the pressure in a regulator chamber to a desired pressure. The demand valve can have a tire valve core. There is also an orifice through which the gas passes from the regulator chamber to an outlet valve which is opened by a demand for gas to supply the gas from the orifice to the interior of a face mask. The assembly is capable of supplying oxygen to the face mask for a period exceeding 15 minutes at a flow rate exceeding 6 liters per minute with very little variation of that flow rate with variations of pressure of the supply of oxygen. Other valves in the Amlong system can also have tire valve cores.

U.S. Pat. No. 4,008,716 (Amlong) discloses a gas dispensing assembly suitable for dispensing oxygen from a vessel pressurized to 1800 pounds per square inch. The assembly includes a manually operable member to turn supply of oxygen from the vessel on and off, and a regulator valve supplied with gas at the pressure inside of the vessel when the supply is turned on. There is a spring biased regulator operable to control the opening and closing of the regulator valve to regulate the pressure in an outlet to a desired pressure for supply of the gas to the interior of the face mask. The assembly is capable of supplying oxygen to the face mask for a period exceeding 15 minutes at a flow rate exceeding 6 liters per minute with little variation of that flow rate with variation of pressure of the supply of oxygen. The demand valve and regulator valve can have tire valve cores.

U.S. Pat. No. 4,294,301 (Lutz) discloses a valve for a tubeless tire which is adapted to be secured in a bore of a tire rim. The latter comprises a tubular valve body with an outer rim surface engagement flange formed on its periphery and spaced from an inner rim surface engagement flange by the length of the bore through the tire rim. The flange acts as the regulator of the core.

U.S. Pat. No. 4,739,813 (Pagani) discloses a tubeless tire valve having a valve body and an external annular gasket, which has an internal through hole. The gasket when not mounted has a diameter partially smaller than the diameter of the cylindrical portion of the valve body on which it will be inserted and partially larger than the latter at the coupling area with the rim. The gasket acts as the regulator of the valve core.

U.S. Pat. No. 2,849,017 (Dickens) discloses inner tube type valves which, when used with tubeless tires, are attached in fluid-tight relationship with the tire rim at the rim valve hole. Herein the blank as described in FIG. 3 acts as a regulator.

U.S. Pat. No. 4,506,695 (Kuypers) discloses a tire valve having a molded tubular plastic insert having a conical seat. Adjacent the seat, integrally molded inward radial ribs engage and guide a valve pin. To the pin is secured a valve element adapted to sealingly engage the seat. The insert is bonded within a molded rubber body. The plastic insert acts as a regulator.

U.S. Pat. No. 3,907,012 (Burke) discloses adaptor fitting for blowing up inflatable devices. The fitting can be attached to the valve stem of a tire or other inflatable articles. The fitting acts as a regulator.

British Patent No. 1,218,372 describes a valve insert as represented in FIGS. 1 and 2, therein. The insert acts as a regulator.

BROAD DESCRIPTION OF THE INVENTION

An object of the invention is to provide a device for depressing tire valve cores in high pressure cylinders. Another object of the invention is to provide a gas dispensing assembly and particularly, though not exclusively, a dispenser for dispensing oxygen when desired from a storage vessel to a face mask. Another object of the invention is to provide a gas dispensing assembly with a conveniently operated arrangement for opening the high pressure control valve of the cylinder when a supply of oxygen is desired, and likewise for closing the high pressure control valve of the cylinder when stopping of the oxygen flow is desired.

The invention involves a gas dispensing assembly suitable for use in combination with an interchangeable high pressure gas supply vessel. The gas dispensing assembly includes (a) regulator means comprising (i) a housing having a first end and a second end and having a passageway therethrough, and (ii) a check valve-gas flow regulator positioned in the passageway of housing (i). The check valve is operable so as to block any gas flow above a predetermined pressure through the passageway of housing (i) from the first end to the second end of housing (i). The gas flow regulator controlling the rate and/or the pressure of the gas exiting from regulator means (a). There is (b) an outlet demand valve means comprising (iii) a housing having a first end and a second end, and having a passageway therethrough, the second end of housing (iii) being detachably connectable to the interchangeable high pressure gas supply vessel, and the first end of housing (iii) being detachably connected to the second end of housing (i) of regulator means (a), a chamber (iv) being formed between the first end of housing (iii) and the second end of housing (i), the height of chamber (iv) being variable by adjusting the distance between the first end of housing (iii) and the second end of housing (i), and (v) an outlet demand valve positioned in the passageway of housing (a). Outlet demand valve (v) has extended actuator means (vi) for opening outlet demand valve (iv), the end of which is positioned beyond the first end housing (iii) so as to extend into the chamber (iv). There is also (c) actuator plate means which is located in a movable manner in chamber (iv). Actuator plate means (c) has at least one passageway therethrough which is not blocked by the extended actuator means (vi) of outlet demand valve (v). Outlet demand valve (v) is opened to high pressure gas flow by means of reducing the height of the chamber (iv) so that actuator plate means (c) forces inward the end of the extended actuator means (vi). Conversely, outlet demand valve (v) is closed to high pressure gas flow by means of increasing the height of chamber (iv) so that extended actuator means (vi) can force actuator plate means (c) upwards.

The invention gas dispensing assembly can be used, for example, for dispensing oxygen when desired from a storage vessel to a face mask. Other gases can also be dispensed using the invention device. Any conventional breathing mask can be used, which preferably is adapted to cover the nose and mouth of a user for the purpose of supplying oxygen thereto.

Any regulator can be used in the invention which meets the requirements of the invention apparatus.

Currently there are a multitude of regulators for face masks for oxygen consumption from high pressure oxygen cylinders. Not all types of high pressure cylinders can be used with such regulators; such regulators are not compatible with high pressure cylinders which have outlet demand valves which use a tire valve core. The invention is particularly useful for allowing such regulators to be used with such high pressure cylinders.

There is a need for a means of depressing a tire valve core with a conventional regulator having a hollow center section. Such hollow center section provides no capability for the regulator to depress the core. The conventional regulars are in the field and, accordingly, cannot be altered in any meaningful manner. In the invention a pressure disc is inserted between a conventional regulator (having a hollow center section) and a tire valve core, which is a part of a generic valve of a high pressure gas cylinder. In this manner, a device is provided for a tire valve core outlet in the demand valve of a high pressure gas cylinder.

BRIEF DESCRIPTION OF THE INVENTION

The preferred embodiment of the invention is shown in FIGS. 1 to 5.

Figure 4:
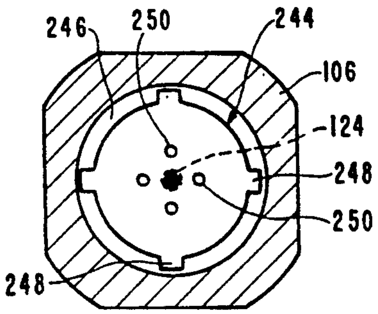
FIG. 4 is horizontal cross-sectional view along line 4—4 in FIG. 1.

Gas dispersing assembly 100 is used in combination with an interchangeable high pressure oxygen supply vessel (not shown). See FIG. 1. The embodiment is described with an oxygen source, the invention apparatus 100 includes regulator 102 and outlet demand valve 104. The horizontal cross-section of invention apparatus 100 is generally square shaped, as shown in FIG. 4, but can have any convenient horizontal cross-section, such as, hexagonal.

Figure 1:
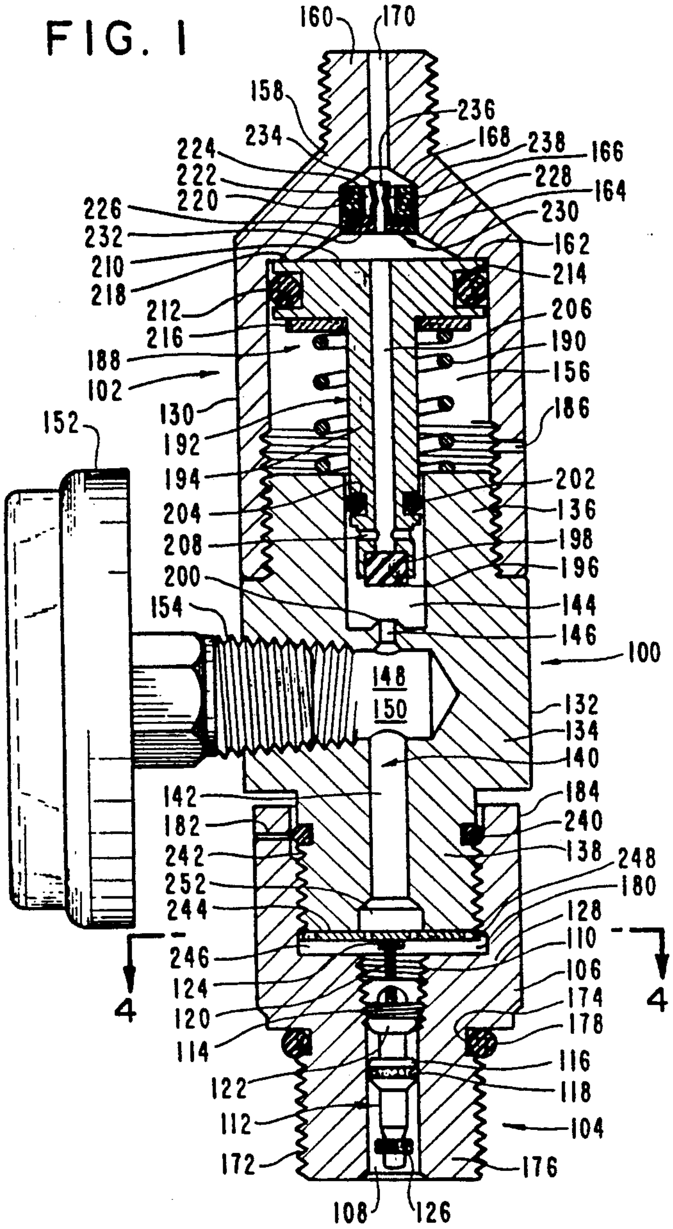
FIG. 1 is a vertical cross-sectional view of an embodiment of the device of the invention, for depressing a tire valve core in the outlet demand valve used in a high pressure cylinder, in the closed position.
Figure 2:
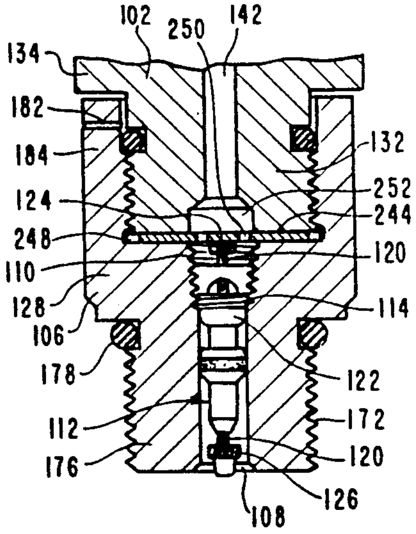
FIG. 2 is a vertical cross-sectional view of a portion of the device of FIG. 1 in the open position.

Outlet demand valve 104 has housing 106 with central bore 108. The upper end of central bore 108 is internally threaded at 110. Housed within central bore 108 is outlet demand valve 112. Outlet demand valve 112 is of a type well known in the art and is basically a tire core valve. Tire core valves are disclosed in U.S. Pat. Nos. 3,976,067 and 4,008,716, the pertinent parts of which are incorporated herein by reference. Outlet demand valve 112 has a threaded portion 114 by means of which it is mounted in a cooperating screw thread 110 of central bore 108. Tire valve core 112 has body 116, which has enlarged portion 118 wherein is located an o-ring run in which o-ring 120 is positioned to provide a seal in central bore 108 (between its top and bottom portions). Pin 120 extends through a vertical bore (not shown) in body 116. Enlarged portion 122 has a chamber therein (not shown) wherein is located a spring (not shown) which upwardly forces plunger, pin 120, as seen in FIG. 1. The top of pin 120 contains disc 124. Stop 126 is located on the bottom of pin 120. Pin 120 is not as wide as the vertical bore, which has guides or ribs (not shown) for pin 120 but which still allow gas flow through the vertical bore when pin 120 is in the depressed position as seen in FIG. 2.

Housing 106 of outlet valve 104 has body portion 128, and bottom portion 176, which is narrower than body portion 128. Bottom portion 176 is externally threaded (172) and has o-ring run 174 at the top of external threads 172. O-ring 178 is located in o-ring run 174. Bottom portion 176 is screwed into an internally threaded bore (not shown) in a high pressure gas cylinder (not shown), with o-ring 178 providing a seal.

Vertical cylindrical bore 180 is located in the upper portion 184 of body portion 128. The middle portion of the vertical wall of bore 180 is threaded. The lower portion and upper portion of the vertical wall of bore 180 are not threaded. Horizontal passageway 182 provides air escape means.

Regulator 102 has upper housing 130 and lower housing 132. Lower housing 132 has central portion 134, externally-threaded upper portion 136 and externally-threaded lower portion 138. Upper portion 136 and lower portion 138 are narrower than central portion 134. Central passageway 140 extends vertically through lower housing 132. Central passageway 140 has lower passageway portion 142, top passageway portion 144 (of relatively wide diameter) and middle passageway portion 146 (of relatively narrow diameter). Horizontal bore 148 in central portion 134 of lower housing 132 is comparative larger in diameter and forms large central cavity 150 (which is part of central passageway 140). Horizontal bore 148 is internally threaded. Pressure gauge 152 is connected to lower housing 132 by screw threads 154 and communicates with central passageway 140 to indicate the gas pressure therein. Pressure gauge 152 can be any convenient or suitable pressure gauge.

O-ring 240 is located in o-ring run 242 in lower portion 138 and provides a movable seal.

Upper housing 130 of regulator 102 has central cavity 156 which has a bottom opening and which internally extends most of the way up upper housing 102. The lower portion of central cavity 156 is internally threaded and is screwed onto externally threaded upper portion 136. Top portion 158 of upper housing 130 is inwardly slanted in the upwards direction and terminates in externally threaded cylindrical portion 160. Rim portion 162 of the top of cavity 156 is flat. The center portion of the top of cavity 156 has inwardly and upwardly slanted portion 164, capped by cylindrical portion 166, which in turn is capped by inwardly and upwardly slanted portion 168. Vertical bore 170 in cylindrical portion 160 provides communication between cavity 156 and the exterior. A face mask (not shown) is connected to regulator 102 by means of a hose having appropriate threaded means (not shown) in a gas communication manner. Horizontal passageway 186 provides air escape means from the lower portion of cavity 156.

Regulator valve 188, which is located in cavity 156, is biased upwards by spring 190. T-shaped body 192 is located in cavity 156 with its leg 194 slidably extending into top passageway portion 144 in central passageway 140. Resilient disc 196 is located in bottom cavity 198 in the bottom of leg 194. When T-shaped body 192 is forced downward far enough by gas pressure, resilient disc, 196 contacts lip 200 of middle passageway portion 146 and cuts off the upwards flow of the pressurized oxygen from the gas cylinder. O-ring 202 is located in o-ring run 204 in the lower portion of leg 194 within top passageway portion 144, and provides a slidable seal between cavity 156 and top passageway portion 144. Central bore 206 vertically traverses through T-shaped body 192 but is blocked on the bottom by resilient disc 196. There is at least two horizontal bores 208 in the bottom portion of leg 194 above resilient disc 196. Horizontal bores 208 provide communication between middle passageway portion 146 and central bore 206. Top arm 210 of T-shaped body 196 is a cylindrical disc. O-ring 212 is located in o-ring run 214 in the outer periphery of top disc 210, and creates a sliding seal between the top portion and the bottom portion of cavity 156. Ring 216 fits over leg 194 up against the bottom surface of top disc 210 by the pressure of spring 190. The top rim of the top disc 210 is biased against out top rim 218 of cavity 156. As T-shaped body 196 is moved downward, the exposed top surface area of top disc 210 is increased.

Plug body 220 is (force) located in cylindrical portion 166. Plug body 220 has vertical bore 222, which has upper bore portion 224 and wider lower bore portion 226. Resilient seal 228 is located in the top of lower bore portion 226. Venturi unit 230 has lower disc 232 which is (force) located in lower bore portion 226 below resilient seal 228. Venturi unit 230 has vertical portion 234, which extends through and beyond upper bore portion 224. Vertical portion 234 is cylindrical with central vertical passageway 236 which contains constructed, venturi portion 238.

Regulator 102 is supplied with gas at the pressure inside of the high pressure oxygen cylinder when the supply is turned on. The spring biased regulator is operable to control the opening and closing the regulator valve to regulate the pressure in bore (outlet) 170 to a desired pressure for supplying the gas to the interior of the face mask. The regulator shown in FIG. 1 is a conventional regulator whose mechanism of operation is well known to the art. The preferred and most important aspect of the invention is the use of disc 244 and the results and advantages that its use provides.

Actuator plate 244 is disc shaped, as best seen in FIG. 4. Disc 244 is round in shape and fits in cavity 246 (the lower portion of bore 180). Disc 244 has four fingers 248, which is almost the side wall of cavity 246. The vertical thickness of disc 244 is less than the height of cavity 246. As shown in FIG. 1, pin or operating stem 120 (disc 124) is normally spring biased against the bottom (central position) of disc 244 so that outlet demand valve 112 is in the closed position. Four vertical holes 250 are located in disc 244 beyond the circumference of disc 124 of pin 120., The bottom portion (252) of lower passageway portion 142 (of central passageway 140) is wide enough to provide communication with vertical holes 250. The circumference of central bore 108 is wide enough to encompass therein vertical holes 250. Vertical holes 250 provide communication between the top portion of central bore 108 and lower passageway portion 142.

Referring to FIG. 2, when housing 106 and lower housing 132 of regulator 102 are screwed together, disc 244 forces pin 120 downward opening up the bottom end of outlet demand valve 112 so that pressurized oxygen can flow upwards through regulator 102 to the face mask. To close off the oxygen flow, housing 106 and lower housing 132 are unscrewed to the position shown in FIG. 1. Manual operation is used to turn on and off the supply of oxygen from the oxygen cylinder.

Figure 3:
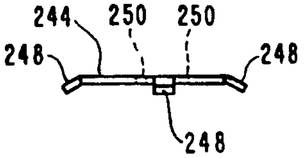
FIG. 3 is a side view of the disc, in the pre-installation mode, used in the device of FIG. 1.

Fingers 248 of disc 244 can be slanted downwards (as shown in FIG. 3) for insertion into bore 180. Screwing housing 138 and regulator 102 forces deformable fingers 248 into a horizontal position, which places disc 244 in operable shape in the invention apparatus.

Figure 5:
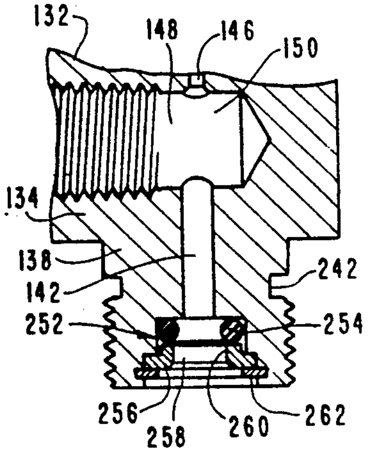
FIG. 5 is a vertical cross-sectional view of a portion of a variation of the device of FIG. 1.

Referring to FIG. 5, the lower end of a conventional regulator 102 is shown which can be used in the invention apparatus. The lower end of bore portion 142 has enlarged stepped segment 252. Vertically, in stepped segment 252, is o-ring 254, disc 256, with central holes 258 with raised lip 260 which sets against o-ring 254, and snap ring 262, which sets in a groove. This arrangement of regulator works in the same manner as the regulator shown in FIG. 1.

Figure 6:
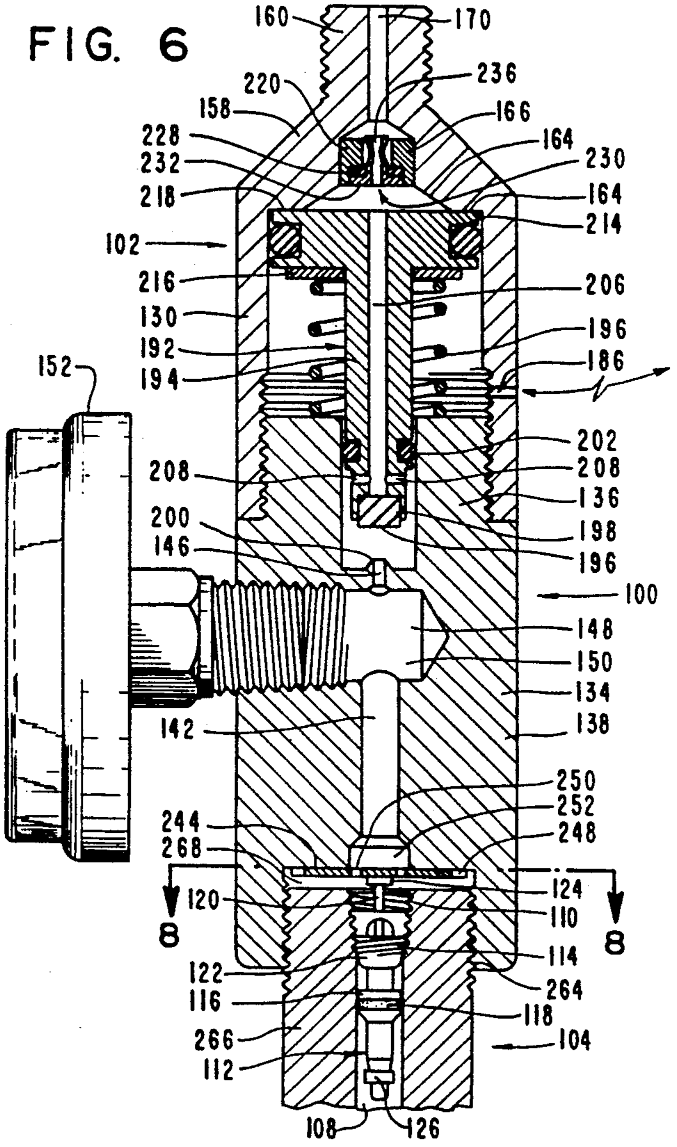
FIG. 6 is a vertical cross-sectional view of another embodiment of the invention in the closed position.
Figure 7:
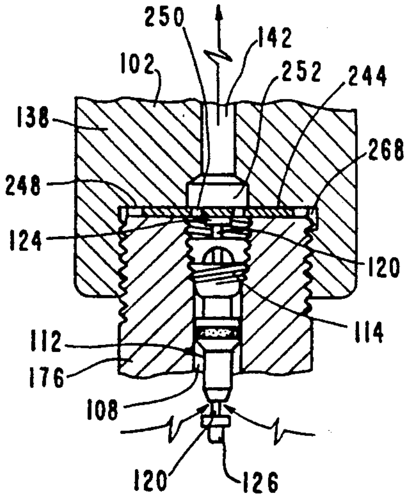
FIG. 7 is a vertical cross-sectional view of a portion of the device of FIG. 6 in the open position.
Figure 8:
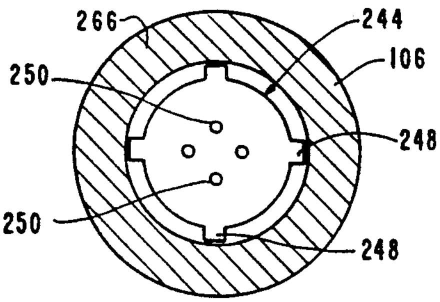
FIG. 8 is a horizontal cross-sectional view along line 8—8 in FIG. 6.

Another advantageous embodiment of the invention is shown in FIGS. 6 to 8. This embodiment is the same as the embodiment shown in FIGS. 1 to 4 except as noted below.

Lower portion 138 of regulator 102 has enlarged bore portion 264 at its bottom, which is internally threaded all but for the top portion. The top portion 266 of outlet demand valve 112 is externally threaded and is screwed into internally-threaded bore portion 264. As shown in FIG. 6, vertical disc 244 fits in cavity 268 which is formed by the mating engagement of bore portion 264 and top portion 266. The vertical thickness of disc 244 is less than the height of cavity 268. Pin 120 (disc 124) is normally spring biased against the bottom (central portion) of disc 244 so that outlet demand valve 112 is in the closed position.

Referring to FIG. 7, when housing 106 and lower housing 132 of regulator 102 are screwed together, disc 244 forces pin 120 downward opening up the bottom end of outlet demand valve 112 so that pressurized oxygen can flow upwards through regulator 102 to the face mask. To close off the oxygen flow, housing 106 and lower housing 132 are unscrewed to the position shown in FIG. 7.

The horizontal cross-section of invention apparatus 100 is round shaped, as shown in FIG. 4.

The various o-ring seals in the invention are used to prevent gas leakages. The o-rings and other sealing material can be made of any conventional o-ring material or other sealing material, respectively, which is not reactive or otherwise negatively effected by the gas.

The other parts of the invention apparatus are generally composed of metal(s) which has sufficient strength and is not corroded or otherwise adversely effected by the gas. Where appropriate, plastic or resin parts can be used.

What is claimed is:

1. Gas dispensing assembly in combination with a high pressure gas supply vessel, comprising:

(a) regulator means for controlling the rate of high pressure gas exiting from the gas dispensing assembly, comprising:
(i) a first housing having a first end and a second end and having a passageway therethrough; and
(ii) a check valve-gas flow regulator positioned in the passageway of said first housing, the check valve being operable so as to block any gas flow above a predetermined pressure through the passageway of said first housing, and the gas flow regulator controlling the rate and/or pressure of the gas exiting from said regulator means;

(b) outlet demand valve means comprising:
(iii) a second housing having a first end and a second end and having a passageway therethrough, said second end of said second housing being connected to said high pressure gas supply vessel, and said first end of said second housing being detachably connected to said second end of said first housing of said regulator means, a chamber being formed between said first end of said second housing and said second end of said first housing, the height of said chamber being variable by adjusting the distance between said first end of said second housing and said second end of said first housing, and said chamber being cylindrical in shape; and
(iv) an outlet demand valve positioned in the passageway of said second housing, said outlet demand valve having extended actuator means for opening said outlet demand valve, the end of which is positioned beyond said first end of said second housing so as to extend into said chamber; and (c) actuator plate means which is located in a movable manner in said chamber, said actuator plate means having at least one passageway therethrough which is not blocked by said extended actuator means of said outlet demand valve, said actuator plate means being a flat plate, and there being at least one arm extending from said flat plate, said outlet demand valve being opened to high pressure gas flow by means of reducing the height of said chamber so that said actuator plate means forces inward the end of said extended actuator means.

2. Gas dispensing assembly as recited in claim 1, wherein said flat plate is circular in shape.

3. Gas dispensing assembly suitable for use in combination with an interchangeable high pressure gas supply vessel, comprising:

(a) regulator means for controlling the rate of high pressure gas exiting from the gas dispensing assembly, comprising:
(i) a first housing having a first end and a second end and having a passageway therethrough; and
(ii) a check valve-gas flow regulator positioned in the passageway of said first housing, the check valve being operable so as to block any gas flow above a predetermined pressure through the passageway of said first housing, and the gas flow regulator controlling the rate and/or pressure of the gas exiting from said regulator means;

(b) outlet demand valve means comprising:
(iii) a second housing having a first end and a second end and having a passageway therethrough, said second end of said second housing being detachably connectable to said interchangeable high pressure gas supply vessel, and said first end of said second housing being detachably connected to said second end of said first housing of said regulator means, a chamber being formed between said first end of said second housing and said second end of said first housing, the height of said chamber being variable by adjusting the distance between said first end of said second housing and said second end of said first housing, and said chamber being cylindrical in shape; and
(iv) an outlet demand valve positioned in the passageway of said second housing, said outlet demand valve having extended actuator means for opening said outlet demand valve, the end of which is positioned beyond said first end of said second housing so as to extend into said chamber; and (c) actuator plate means which is located in a movable manner in said chamber, said actuator plate means having at least one passageway therethrough which is not blocked by said extended actuator means of said outlet demand valve, said actuator plate means being a flat plate, and there being at least one arm extending from said flat plate, said outlet demand valve being opened to high pressure gas flow by means of reducing the height of said chamber so that said actuator plate means forces inward the end of said extended actuator means.

4. The gas dispensing assembly as claimed in claim 3 wherein the flat plate has four arms, which are located at about 90 degrees from each other around the perimeter of the flat plate.

5. The gas dispensing assembly as claimed in claim 4 wherein there are four passageways in the flat plate.

6. The gas dispensing assembly as claimed in claim 5 wherein the four passageways are located at about 90 degrees from each other around the area where the extended actuator means of outlet demand valve (v) contacts the flat plate.

7. The gas dispensing assembly as claimed in claim 6 wherein the four arms are deformable.

8. Gas dispensing assembly as recited in claim 3, wherein said flat plate is circular in shape.

* * * * *